United States Patent [19]

Yamano

[11] Patent Number: 4,644,356

[45] Date of Patent: Feb. 17, 1987

[54] BISTATIC COHERENT RADAR RECEIVING SYSTEM

[75] Inventor: Larry C. Yamano, Sunnyvale, Calif.

[73] Assignee: The United States of America as represented by the Secretary of the Air Force, Washington, D.C.

[21] Appl. No.: 666,841

[22] Filed: Oct. 31, 1984

[51] Int. Cl.[4] .......................................... G01S 13/52
[52] U.S. Cl. .................................. 342/160; 342/194; 342/196
[58] Field of Search ............ 343/5 CM, 5 FT, 5 NQ, 343/5 SA, 7.7, 17, 17.1 R; 342/59, 93, 159–162, 194–197

[56] References Cited

U.S. PATENT DOCUMENTS

| | | | |
|---|---|---|---|
| 2,681,425 | 6/1954 | Haeff | 315/13 |
| 3,706,991 | 12/1972 | Gillmer et al. | 343/7.7 |
| 3,725,923 | 4/1973 | Bosc et al. | 343/7.7 |
| 3,885,224 | 5/1975 | Klahr | 343/5 CM X |
| 3,927,405 | 12/1975 | Poinsard et al. | 343/5 CM |
| 3,950,750 | 4/1976 | Churchill et al. | 343/17.7 |
| 4,021,804 | 5/1977 | Dounce et al. | 343/17.1 R |
| 4,095,224 | 6/1978 | Dounce et al. | 343/17.1 R |
| 4,114,152 | 9/1978 | Wiedemann et al. | 343/7.7 |
| 4,222,050 | 9/1980 | Kiuchi et al. | 343/7.7 |
| 4,246,580 | 1/1981 | Caputi, Jr. | 343/5 CM |
| 4,325,065 | 4/1982 | Caputi, Jr. | 343/5 CM |
| 4,563,686 | 1/1986 | Boles | 343/17 |

OTHER PUBLICATIONS

Tactical Systems: Coherent Bistatic Radar Technology, brochure, ESL (Subsidiary of TRW, Inc.).

*Primary Examiner*—Thomas H. Tarcza
*Assistant Examiner*—Bernarr Earl Gregory
*Attorney, Agent, or Firm*—Gerald B. Hollins; Donald J. Singer

[57] ABSTRACT

A coherent-on-receive MTI radar receiver system for use with cooperative or non-cooperative radar transmitters of either the coherent or noncoherent, simple magnatron type and scanning antennas. The receiver includes coherent digital signal processing with provision for normalizing or compensating phase variations in the transmitter carrier pulses.

20 Claims, 7 Drawing Figures

BISTATIC COHERENT RADAR RECEIVING SYSTEM

RIGHTS OF THE GOVERNMENT

The invention described herein may be manufactured and used by or for the Government of the United States for the governmental purposes without the payment of any royalty.

BACKGROUND OF THE INVENTION

This invention relates to the field of radar signal processing within a radar receiver system.

Bistatic coherent radar displays find increasing tactical application in meeting air surveillance needs where reliance upon radiation from either a cooperative or non-cooperative transmitter is appropriate. The use of coherent-upon-receive techniques and digital signal processing in receivers of this type and the ability to use non-coherent target illuminating sources operating in a variety of radar frequency bands has made equipment of this type increasingly useful in modern radar detection and tracking.

The patent art includes several examples of radar apparatus relating to the present invention, this art includes the U.S. Patent of Eichi Kiuchi et al, U.S. Pat. No. 4,222,050, which discloses a radar system wherein the radar return signal is separated into quadrature components appearing at detectors 121 and 122. These quadrature components are converted into digital samples by analog-to-digital converters 131 and 132 and then applied to a continuous discrete Fourier transform unit 133 and a post transform processing unit 134.

The Kuichi patent is principally concerned with the utilization of a fast Fourier transform circuit in the environment of a conventional radar transmitter-receiver. One of the two Fourier transform algorithms employed in the Kiuchi patent was proposed by J. W. Coolie et al in the article "An Algorithm for the Machine Calculation of Complex Fourier Series" appearing in the publication Mathematics Computation, Vol. 19, No. 90, p. 297, April 1965. The Kiuchi patent also refers to an embodiment of the Coolie algorithm described by G. C. O'Leary in a paper "Nonrecursive Digital Filter Using Cascade Fast Fourier Transformers" published in IEEE Transactions on Audio and Electro Acoustics, Volume AU-18, No. 2, June 1970. The disclosure of the Kiuchi U.S. Pat. No. 4,222,050, the Coolie article and the O'Leary paper are hereby incorporated by reference into the present specification.

The Kiuchi patent is concerned with a conventional radar arrangement including a phase quadrature synchronous detector and an analog-to-digital converter wherein the transmitter and receiver are colocated and employ a common antenna for transmitting and receiving. The Kiuchi patent is largely silent with respect to the processing performed on signals emanating from the discrete Fourier transform circuitry. Neither the Kiuchi, Coolie or O'Leary documents are concerned with a radar receiver using target illumination by a noncooperative radar transmitter.

The patent of Ilich A. Dounce et al, U.S. Pat. No. 4,021,804, discloses a coherent timing system for a coherent-on-receive radar wherein a closed-loop circuit arrangement involving digital coded phase signals is employed to maintain coherence of the received signal. The Dounce apparatus is principally concerned with the closed-loop arrangement for maintaining coherence and provides only an output signal for further processing and use. The Dounce apparatus is also concerned with a radar apparatus having commonly located transmitter and receiver units and a single antenna for transmission and receiving.

The patent of Frederick E. Churchill, U.S. Pat. No. 3,950,750 is also concerned with maintaining coherence in a radar receiver. In the Churchill apparatus maintenance of the desired coherent phase relationships allows reduction of the amount of clutter appearing in the radar output signal. The Churchill apparatus employs a test signal that is periodically introduced into the quadrature phase detector of the radar system and uses the system response to this test signal to correct the return signals during normal radar operation. The Churchill apparatus mentions the use of a Fourier transform compensator following the phase detector or synchronous detector apparatus and discloses details of the Fourier transform output signal and its use in the correction process. The Churchill apparatus is silent with respect to contemplated use of the disclosed invention with a combination transmitter and receiver radar apparatus or a receive-only apparatus. Additionally, no discussion concerning use of the invention in a receiver intended for use with targets receiving illumination from a non-cooperative radar is included. The Churchill apparatus is also minimally concerned with the processing employed after the Fourier transform is accomplished. This disclosure of the Churchill patent is hereby incorporated by reference into the present specification.

The patent of H. J. Bose, U.S. Pat. No. 3,725,923, discloses a coherent pulsed doppler radar system which uses digital signal processing, a synchronous phase detector and Fourier transformation of memory data representing the past history of a range bin, that is, consideration of the signal contents of identically located range bins from a plurality of previous scans.

The Bose patent contemplates the use of a radar transmitter providing non-equidistant pulses but of the coherent type. The patent is silent with respect to use of the disclosed system in a non-cooperative illuminating radar and distantly located passive receiver environment. The Bose patent additionally employs threshold level processing following the Fourier transform and uses a spectrum display of the transformed signal.

SUMMARY OF THE INVENTION

An object of the present invention is to provide a coherent-upon-receive radar receiver capable of operating with target illumination by remotely located noncooperative radar transmitters with scanning antennas.

Another object of the invention is to provide a coherent radar system capable of operating with a noncoherent remotely located radar transmitter.

Another object of the invention is to provide a coherent radar receiver having compensation for phase variations encountered in received radar signals.

These objects are achieved by a method and apparatus for coherently processing moving target indication (MTI) radar signals involving the generation of sine and cosine related quadrature signals which are integrated and stored according to periodic range bin samples and subsequently transformed into frequency domain Fourier transform signals. The Fourier transform signals are subsequently processed to exclude certain velocity components and the resulting processed signals displayed in an organized relationship.

DETAILED DESCRIPTION OF THE DRAWINGS

Figure 1:
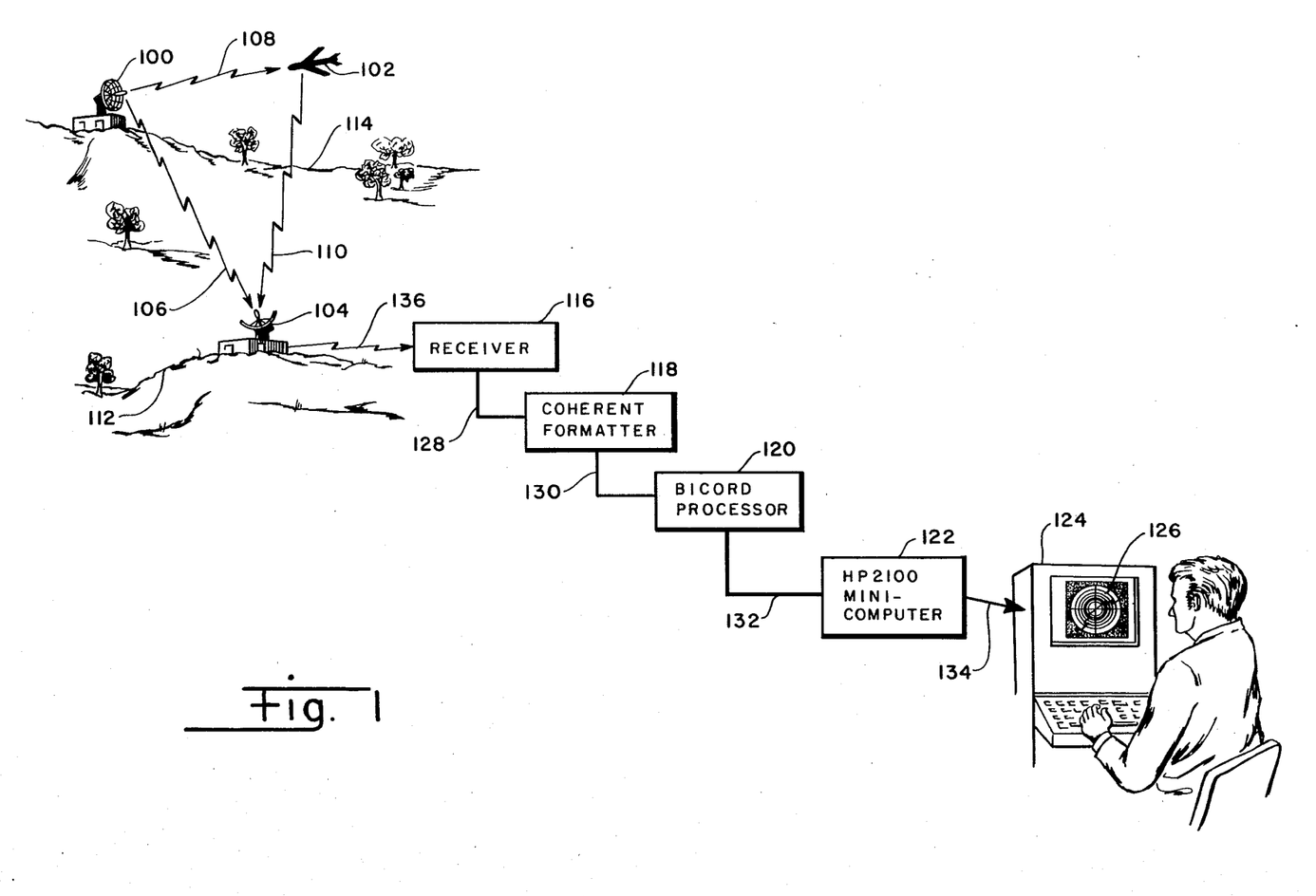
FIG. 1 is an overall view of a bistatic coherent radar display system.

FIG. 1 is an overall view of a bistatic coherent radar system wherein a target such as the aircraft 102 is illuminated by a remote radar apparatus 100; the remote apparatus includes a pulsed radar transmitter that may be of the coherent or the non-coherent simple magnetron variety. The FIG. 1 system also includes a receiving radar antenna 104 which can be located on a terrain feature such as the hill 112 and which is coupled to a radar frequency receiver 116 by way of a signal transmission line 136. The receiving antenna 104 can also of course be airborne. The receiving antenna 104 is contemplated to receive radar pulses directly from the radar apparatus 100 along the path 106 and to receive reflected pulses having altered phase and doppler frequency components along the path 110 from the target aircraft 102. The target aircraft 102 receives pulses of radiation from the radar apparatus 100 along the path 108. The antenna 104 will also receive return signals from stationary objects and terrain features such as are indicated at 114, such returns are classified as clutter and originate primarily from the specular components rather than the diffuse scattering components of the signal from the radar apparatus 100.

The FIG. 1 arrangement contemplates that the radar apparatus 100 may be separated from the receiving antenna 104 by a considerable distance and that the transmitter and the apparatus 100 can be of either the cooperative or noncooperative type and either coherent or noncoherent in nature. The receiving antenna 104 and the receiver 116 are considered to be passive, nonradiating devices in the FIG. 1 apparatus in that they rely on target illumination by an exterior transmitter. The advantages of a passive parasite radar receiver include low operating energy requirements, desirable jamming immunity, and a capability for determining location of the emitting source using footprints of the clutter return signal from terrain features 114.

Figure 7:
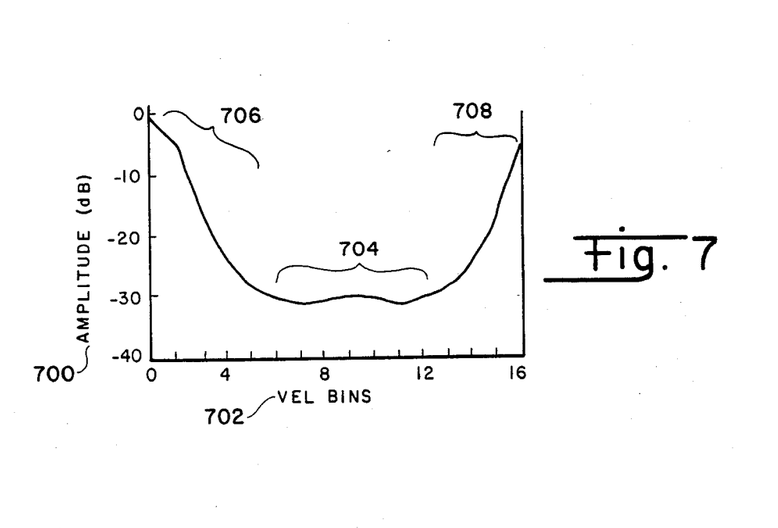
FIG. 7 shows the output spectrum of a typical illuminating radar transmitter usable in the FIG. 1 system.

Returning again to FIG. 1, an embodiment of the illustrated apparatus might, for example, include a 10 dB standard gain horn for the antenna 104, a simple coherent receiver with a 3 MHz second intermediate frequency output for the receiver 116 and a FAA air route surveillance radar of the ARSR-IE type for the radar apparatus 100, the FAA radar being one of many possible radar illuminating sources. A typical 16-pulse average clutter spectrum for this radar is shown in FIG. 7 of the drawings.

The 3 MHz signal from the receiver 116 is coupled along the path 128 to the formatter, processor, and computer blocks 118, 120 and 122 in FIG. 1 and ultimately displayed on a viewing screen such as the pain position indicator (PPI) display 126. The PPI display 126 is mounted in an operator's console 124, this console may be arranged to include one or more of the blocks 118, 120, 122 if desired and may be mounted in a building or in a movable van. Details of the blocks 118, 120 and 122 and of the signals communicated between these blocks on the paths 128, 130, 132 and 134 are included in the following parts of this description.

Figure 2:
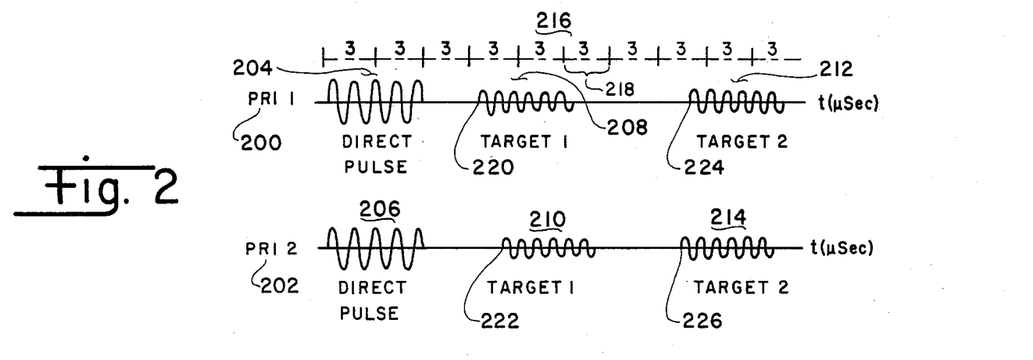
FIG. 2 describes a group of signal waveforms pertinent to the FIG. 1 system.

FIG. 2 illustrates several properties of typical signals transmitted along the path 128 between the receiver 116 and the coherent formatter 118. This example assumes a pulsewidth of 6 microseconds from the transmitter 100. The waveform 204 in FIG. 2 represents a transmitter output pulse such as might be received by way of the direct path 106 in FIG. 1, while the waveforms 208 and 212 represent reflections of this transmitter pulse from two different targets. The transmitter direct pulse 204 arrives at the antenna 104 prior to the reflected signals because the direct path 106 is shorter than any possible reflected path, this direct pulse is found to be especially useful in the signal processing described below. The transmitter pulse 204 is received at all azimuth positions of the transmitting antenna, however, it has greatest amplitude when the transmitting antenna is oriented directly toward the receiving antenna 104. The transmitter pulse 204 may have a duration of 6 microseconds, as is indicated by the time scale 216, and is separated from the next subsequent transmitter pulse 206 by a long time interval such as 700–800 microseconds. The summation of transmitter pulse duration and the separation time between adjacent transmitter pulses is named the pulse repetition interval (PRI), PRI identifications are shown at 200 and 202 in FIG. 2.

The time scale 216 in FIG. 2 is shown divided into contiguous 2 microsecond time increments as indicated at 218, these time increments commence with the radar transmitter pulse 204 and have an arbitrary relationship with the target returns 208 and 212. The time increments 218 are given the name of range bins, and may be considered to attend or append each transmitter pulse in the sense that they commence with the starting of a transmitter pulse and continue into the receiving time following a pulse. It is possible in radar theory to define many of the characteristics of a target return by representing the target on a plane of orthogonal coordinates representing range and velocity; the range and velocity axes in this representation may be divided into velocity bins and the range bins shown at 218 in FIG. 2. In the FIG. 2 example, there are a total of 256 range bins between adjacent radar transmitter pulses 204 and 206 and each range bin is substantially one-half of a transmitter pulse duration. A range bin time duration of one-half the transmitter pulse width provides the advantage of preventing 3 dB range straddling losses in the receiver.

Considering now the nature of the pulses in FIG. 2, the transmitter pulses 204 and 206 are shown to be coherent in nature, that is, each pulse starts at the same point on the pulse waveform and the subsequent portions of the pulses are identical. Pulses 208 and 210 represent the first of the FIG. 2 targets as illuminated by two successive transmitter pulses and are shown to be displaced in time; the later starting time 222 of the second PRI pulse in comparison with the starting time 220 of the first PRI pulse indicates the first target moved farther away from the receiving antenna 104 between first and second pulse repetition intervals. In similar fashion the pulses 212 and 214 representing the second target in FIG. 2 indicate movement of this target toward the receiver 104 during the time interval between first and second transmitter pulses 204 and 206; this is shown by the relative position of the two pulse startings at 224 and 226. In addition to the illustrated time difference between target returns in the first and second pulse repetition interval, there may also exist phase and frequency differences, which are not shown in FIG. 2, between target returns in adjacent pulse repetition intervals. Amplitude differences may also exist between different targets or between returns from the same target depending on target size, orientation, and reflectivity characteristics.

Figure 3:
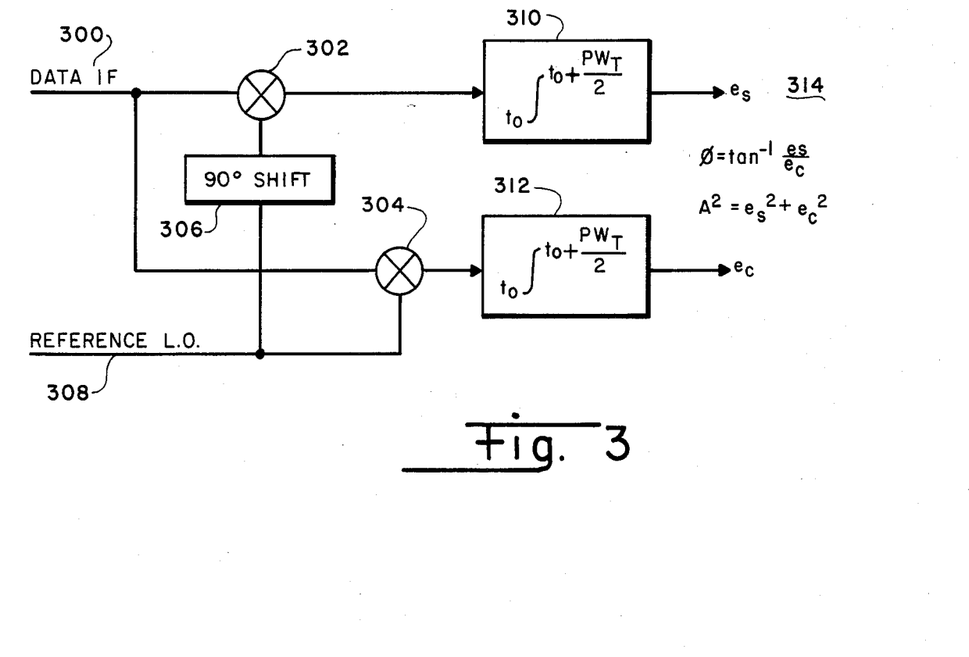
FIG. 3 shows the preliminary signal processing used in the FIG. 1 apparatus.

Processing components which may be used in the coherent formatter 118 in FIG. 1 are shown in FIG. 3 of the drawings. The FIG. 3 apparatus includes a source of intermediate frequency data such as the 3 MHz path 128 data described above, this data arrives on the conductor 300 in FIG. 3 and is fed to a pair of radio frequency mixer or multiplier circuits 302 and 304. In the mixer or multiplier circuits 302 and 304 mixing of the 3 MHz signal with the signal of a local oscillator which arrives on the conductor 308 occurs. A 90° phase shift is applied to the local oscillator signal used in one of the FIG. 3 mixers as shown at 306 in order that output signals representing quadrature component or sine and cosine related versions of the data input signal be available from the integrators 310 and 312. These quadrature related components of the integrated intermediate frequency signal are identified as $e_s$ and $e_c$ in FIG. 3. As shown by the equations at 314 in FIG. 3 the $e_s$ and $e_c$ signal components or quadrature cell samples define completely the amplitude and phase relationship of the input signal at 300. The mathematical integrations indicated at 310 and 312 in FIG. 3 preferably occur over a time interval equal to the duration of one FIG. 2 range bin, or 3 microseconds in that example. The formation of the $e_s$ and $e_c$ signals is named a Hilbert transform and can be accomplished with hardware as illustrated in FIG. 3 or alternately can be performed with a programmed digital computer and appropriate software.

Figure 4:
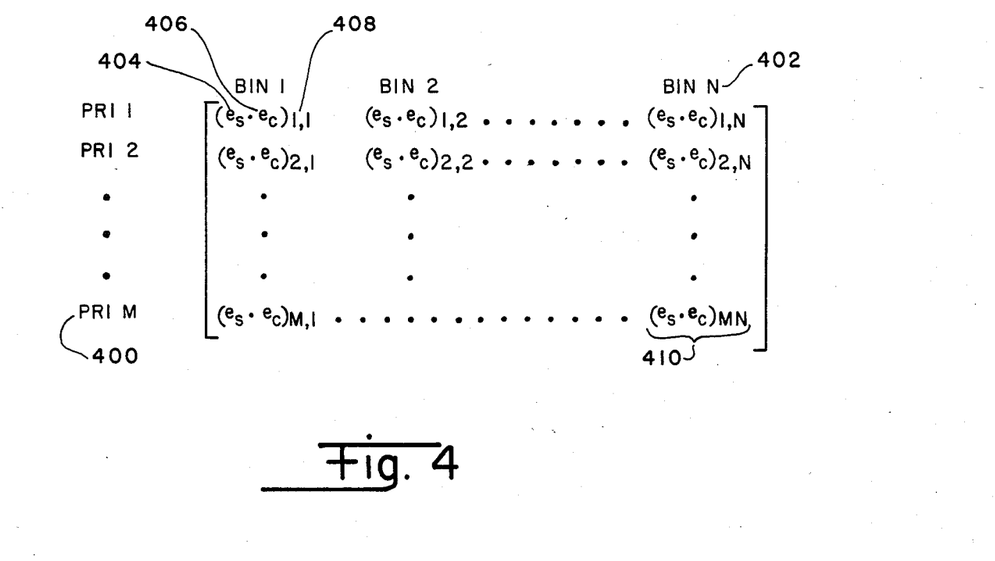
FIG. 4 shows the organization of a memory array or matrix used for data storage in the FIG. 1 system.

The arrangement of successive $e_s$ and $e_c$ data samples from the FIG. 3 integrators in a matrix or data array is shown in FIG. 4 of the drawings. The FIG. 4 data array preferably contains 256 vertical columns and 32 horizontal rows in correspondence with 256 range bins and 32 pulse repetition intervals of FIG. 2 scan data. The 256 range bins and 16 pulse repetition intervals are indicated at 402 and 400 in FIG. 4. Within each range bin cell of the FIG. 4 array there is stored a value of $e_s$, 404; $e_c$; 406; and a cell identifying code 408. It is of course possible to eliminate storage of the cell identifying code 408 so long as identity of each pair of values in the array is maintained in some ordered fashion.

The array of data shown in FIG. 4 may be stored in any desired storage arrangement, however the use of a short-term or scratch pad memory is a preferable form for assembling and retaining this array. The FIG. 4 array can of course be physically arranged to conform to the scratch pad memory or other storage device dimensions and need not physically appear in the form shown in FIG. 4. The data from 16 pulse repetition intervals is considered simultaneously in the processing which follows the FIG. 4 array, it is however found desirable to store an additional 16 pulse repetition intervals of data in the FIG. 4 array in order that processing and data loading can occur concurrently; that is, in order that data from the first 16 PRI events be undergoing processing at the same time as loading of a second 16 PRI group of data is being accomplished. Shifting or transferring of the data between PRI rows in the FIG. 4 array as processing is accomplished can be readily accomplished by serial or parallel techniques known in the computer art. Prior to being stored in the FIG. 4 data array, the $e_s$ and $e_c$ integrator output signals are, of course, digitized with analog-to-digital converter circuits which are not shown but which sample the $e_s$ and $e_c$ values once for each 3 microsecond range bin interval.

As can be appreciated from the FIG. 2 and FIG. 4 drawings, the $e_s$ and $e_c$ values in the first range bins of each pulse repetition interval in the FIG. 4 array are associated with the transmitter pulse, the pulse received along the direct path 106 in FIG. 1 between transmitter and receiver. This first array value in each PRI is employed for compensation or correction of the remaining PRI pulses as described below. This compensation or correction can also be thought of as normalizing all of the PRI returns relating to one transmitter pulse to the phase of that transmitter pulse. Prior to this compensation, however, and in order to accommodate the random synchronization of range bin intervals with target returns where the target return lies in more than one range bin interval, it is found convenient to sum the values in adjacent range bin cells of the FIG. 4 array. This summing creates the sum of the values in range bin cells 1 and 2, 2 and 3, 3 and 4, and so on in order to recreate the original target pulse width phases and amplitudes. This summing generates a second array of the type shown in FIG. 4 wherein the array values indicate target presence with the largest possible array amplitude values.

Data in this second array of the FIG. 4 type is phase compensation processed to remove signal instabilities and enable coherent processing of the scan data in subsequent steps. In the phase compensation step, the $e_s$ or $e_c$ values for each range bin cell, in the same pulse repetition interval, is subtracted from the $e_s$ and $e_c$ value associated with the direct pulse 204 of FIG. 2. Preferably the first $e_c$ and $e_s$ values in each pulse repetition interval are employed for this subtraction and are subtracted from each succeeding $e_c$ and $e_s$ array value in that pulse repetition interval to accomplish the phase compensation. As indicated above, these first $e_s$ and $e_c$ values in each PRI originate with the direct pulse received from the transmitter along the path 106 in FIG. 1. Alternately some other $e_s$ or $e_c$ value in each pulse repetition interval, that is, a value which is not directly transmitter-based, could be employed for this subtraction process to accomplish the phase compensation. As indicated above, the phase subtraction process removes transmitter instabilities on a PRI-to-PRI basis so that coherent processing integration can be performed over a selected number of PRIs, typically 16. Phase compensation also accommodates transmitter phase variations such that the coherent processing of the present invention can be performed on signals originating with a simple magnetron or other types of noncoherent radar transmitters.

Figure 5:
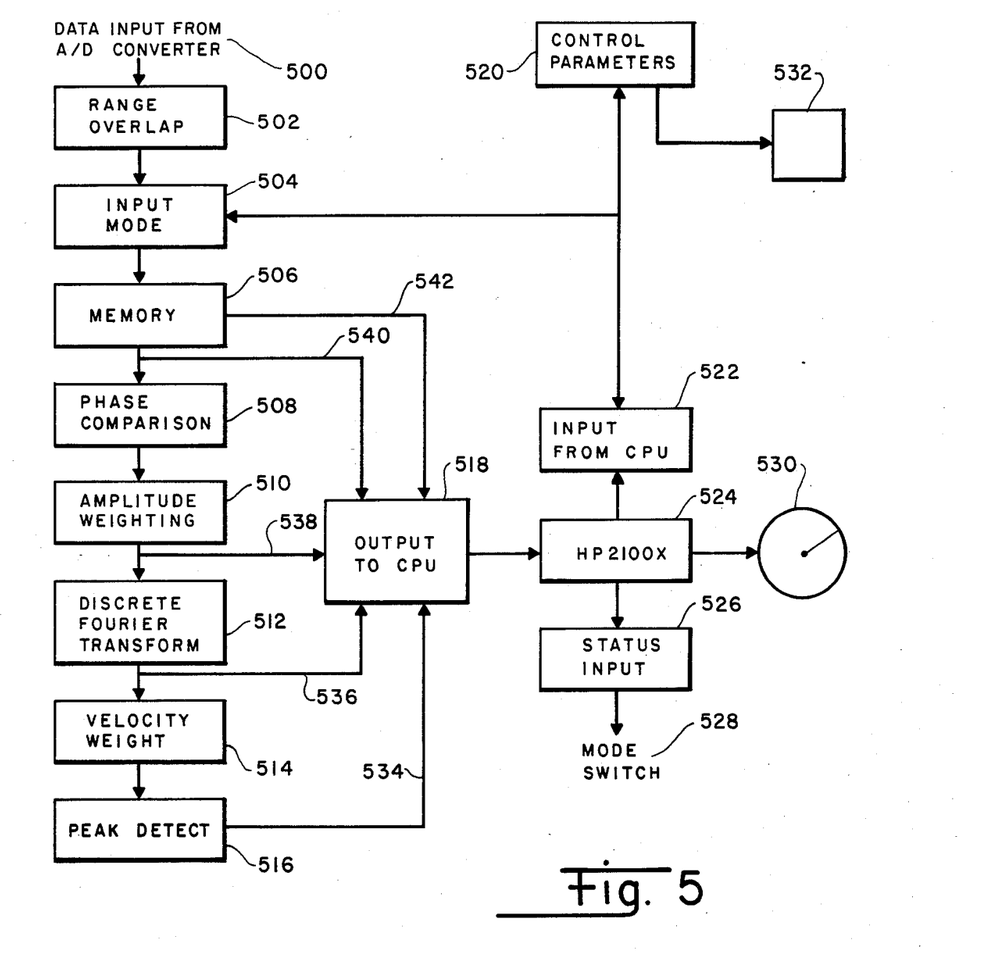
FIG. 5 shows a block diagram of the signal processing used in the FIG. 1 system.

The processing performed on the FIG. 2 target waveform data is shown in complete form in FIG. 5 of the drawings; portions of this FIG. 5 processing have been described heretofore and are repeated in FIG. 5 for the sake of overall clarity. Data received from the analogto-digital converters that operate on the FIG. 3 integrator output signals $e_s$ and $e_c$ is indicated at 500 in FIG. 5. The range overlap addition of two adjacent range bin values is indicated at 502 in FIG. 5, this addition is preferably accomplished in hardware form using one stored value and one presently occurring value of $e_s$ and $e_c$ respectively. The input mode block 504 enables operator selection of such processing parameters as which value of $e_c$ or $e_s$ is to be used in the phase compensation step; allowing this selection by an operator can improve system performance in the presence of some signal conditions. The input mode block receives operator commands from the control parameters block 520, the block 520 indicates reception of operator inserted input parameters to the system. The input parameters received at the block 520 are displayed on an alphanumeric display 532.

The FIG. 4 array first appears in memory in the block 506 of FIG. 5; the phase compensation, indicated at block 508, may be performed by creation of a second array in a second memory element as described or can alternately be accomplished by replacing individual array elements in the memory storing the FIG. 4 array. Although only a single array of values in a scratch pad memory is needed in the FIG. 5 processing i.e., the array described herein as the second array, it is convenient to consider that each of the processing steps in FIG. 5 creates a new array of values even though such subsequent arrays may not physically exist.

Following the phase compensation step indicated at 508 in FIG. 5, amplitude weighting is applied to the second array values in order that side bands created in a Fourier transform operation be limited in value. This amplitude weighting is preferably accomplished in accordance with the Hamming or alternately a cosine amplitude weighting criteria. Application of the Hamming criteria reduces the Fourier transform side lobe amplitudes with respect to the main signal lobe—to better distinguish the main lobe signal as is known in the signal processing art.

The discrete Fourier transform indicated at 512 in FIG. 5 contemplates mathematical manipulation of the $e_s$ and $e_c$ values from the same range bin cell in a predetermined number of pulse repetition intervals of the FIG. 4 second array. The Fourier transform is complex in nature, that is, the $e_s$ and $e_c$ values are treated as real and imaginary components of the transform input. The above-referenced fast Fourier transform algorithm or other Fourier transform algorithms which are known in the art may be employed for performing the block 512 transformation. The Fourier transform receives inputs from each group of 16 similarly located range bins in 16 pulse repetition intervals, and these 16 pulse repetition intervals are updated in 8 PRI groups. According to this grouping, therefore, data from the sequentially accessed bins of PRIs 1-16 in FIG. 4 are first operated upon followed by data from the sequentially accessed range bins in PRIs 9-24, followed by data from PRIs 17-32 and so on.

Figure 6:
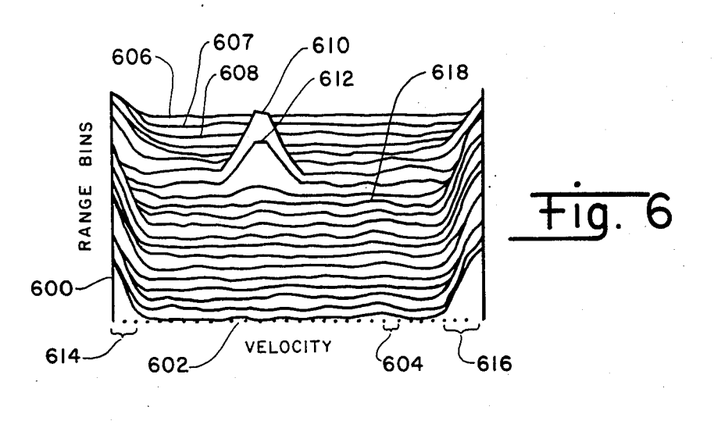
FIG. 6 shows a family of waveforms representing signals processed in the FIG. 1 apparatus.

A three-dimensional plot of the Fourier transform output data for a one target example such as shown in FIG. 1 is represented in x-y, two-dimensional form in FIG. 6 of the drawings. In FIG. 6 each of the generally horizontal lines, for example, the lines 606, 607, 608 represents the Fourier transform of FIG. 4 array data from the same range bin cell in, for example, the 16 described pulse repetition intervals, i.e., the line 606 may for example represent the transformed data from range bin cell number 1 for 16 pulse repetition intervals while the line 607 represents transformed data from range bin cell number 2 for 16 pulse repetition intervals and so on. It should be realized that the lines in FIG. 6 are intended to represent a three-dimensional surface wherein the peaks 610 and 612 rise out of the plane of the FIG. 6 drawing in a third coordinate axis direction.

The peaks in 601 and 612 represent the presence of data in two of the range bin columns of FIG. 4 where the data originates with a moving target. The velocity of the moving target is indicated by the increments 604 along the horizontal axis 602 in FIG. 6 while the identity of the range bins containing the moving target representation is shown along the vertical axis 600 in FIG. 6. The signal peaks at 614 and 616 in FIG. 6 relate to the discrete Fourier transform property of splitting the power spectrum at zero velocity and at the ambiguous velocity, velocity bins 1 and 16 respectively; these peaks are removed in the velocity weighting step at 514 in FIG. 5.

These velocity bin 1 and 16 peaks in the FIG. 6 representation of transformed data also illustrate the presence of low doppler clutter power at the low and ambiguous velocities, moveover, as shown in FIG. 6 this clutter is fairly coherent so that uniform velocity weighting over the higher velocity cells will give the system good moving target indication (MTI) performance.

The Fourier transform processing produces sin x/x velocity side lobes which are modified by the Hamming weighting applied prior to the Fourier transform processing. The system RMS accumulated phase error must be less than 6° for velocity side lobes to be 30 dB lower than the remaining signal portions. A system with phase coherence that is adequate to meet the velocity side lobe criteria does not suffer from processing losses, such degradation being less than 0.1 dB. A clutter improvement factor (CIF), the ratio of signal to clutter at the output as compared with signal to clutter ratio at the input, of 30 dB is attained with the Hamming weighting.

Following the discrete Fourier transform at 521 in FIG. 5 velocity weighting is used in the block 514 to remove the low velocity and ambiguity velocity peaks at 614 and 616 in the FIG. 6 representation of transform data. Peak detection is then applied is isolate the large amplitude peaks at 610 and 612 from the lower amplitude background clutter peaks such as indicated at 618 in FIG. 6. The peak detecting is indicated at 516 in FIG. 5 and may be accomplished with a simple amplitude threshold discriminating circuit as is known in the art. In the peak detecting, the amplitude, range bin, and PRI set number data for a peak exceeding the amplitude threshold is stored for use in the PPI display 530. The presence of a peak exceeding the predetermined amplitude threshold is indicated through the output circuitry 518 by a signal on the path 534. The range bin and PRI set number for this threshold exceeding peak are supplied to the output circuitry 518 along the path 542 from the memory 506. The paths 536, 538 and 540 which connect the output circuitry with the output of the discrete Fourier transform, the amplitude weighting circuit 510 and the memory 506 respectively serve to provide the operator data which aids in trouble shooting the respective circuits.

The central processor or computer 524 in FIG. 5 serves principally to control a flow of information in the FIG. 5 system and also to perform the bistatic range correction function for relating the relative physical positions of the receiving antenna 104 to the location of the transmitting apparatus 100 for the target 102 in FIG. 1. The computer may be embodied in the form of a model HP 2100X minicomputer which is sold by Hewlett-Packard Inc. of 1501 Page Mill Road, Palo Alto, CA, and may employ software as required for performing the information flow control and range correction operations described above. Alternately the computer 524 may be replaced with special purpose hardware circuitry which would be apparent to persons skilled in the art from the foregoing description and the FIG. 5 diagram.

The mode indication 528, the status inputs 526 and the previously described control parameters 520 in FIG. 5 serve to control the operation of the FIG. 5 system in conjunction with the computer 524 and to allow operator selection of display and processing parameters. Specifically, these additional blocks provide the following display option functions:

a. Receiver reference at the center of the PPI display
 b. Transmitter reference at the center of the PPI display
 c. Single scan display
 d. Multiple scans displayed in rapid sequence (flicker effect)
 e. Operator test modes By way of comparing the performance of the present system with that of existing radar arrangements. The model ARSR-1E FAA radar previously mentioned employs a dual-canceller circuit arrangement wherein a clutter improvement factor of 35 dB including two-way antenna side lobe attenuation is achieved. In the present system a clutter improvement factor of 34 dB for real-time operation and 33 dB using an analog recorder for data capture is achieved; alternately these factors relate to phase noise figures of 2.7° and 3.1°. The sources of the total system effective phase noise components is outlined in Table 1 below. In the Table 1 data, it is to be noted that the major transmitter phase noise component is introduced by FAA ARSR-1E radar frequency instability while the major receiver noise source lie in the coherent formatter and the coherentise-on-receive technique.

TABLE I

Hardware Instability Measurement and Effect on Clutter Improvement Factor

| Noise Source | Effective Phase Noise (Degrees) | 16 Pulse Average Clutter Improvement Factor |
|---|---|---|
| Transmitter | | |
| Pulse Amplitude Noise (0.3%) | 0.3 | 48 dB |
| Pulse Width Jitter (10 msec) | 0.5 | 44 dB |
| Pulse Position Jitter (2 msec) | 0.0 | 50 dB |
| XMtr Freq Stability (10 MHz) | 1.5 | 37 db |
| Receiver | | |
| CSP Noise | 1.5 | 37 db |
| Reference Phase Noise | 1.5 | 37 db |
| Analog Recorder, RCA CVR62 | 2.0 | 34 dB |
| Local Oscillator Stability | 0.0 | 50 dB |
| Digitizing Quantization Noise | 0.1 | 50 dB |
| Filter Sidelobe | 0.6 | 42 dB |
| Total | | |
| Real Time Capability | 2.7 | 34 dB |
| Analog Recorder | 3.1 | 33 dB |

TABLE I-continued

Hardware Instability Measurement and Effect on Clutter Improvement Factor

| Noise Source | Effective Phase Noise (Degrees) | 16 Pulse Average Clutter Improvement Factor |
|---|---|---|
| Playback Capability | | |

The present system therefore provides an ability to coherently process data from noncoherent transmitters either of the cooperative or non-cooperative variety while also providing a greater than 30 dB clutter improvement factor (a 9-12 dB integration gain). The system performs coherent processing on signals from typical non-coherent (magnatron) transmitters. The system also achieves desirable MTI performance.

While the apparatus and method herein described constitute a preferred embodiment of the invention, it is to be understood that the invention is not limited to this precise form of apparatus or method, and that changes may be made therein without departing from the scope of the invention which is defined in the appended claims.

We claim:

1. A method for coherently processing MTI radar receiver signals originating from a target that receives pulsed radar illumination from a non-cooperative remote transmitter and from said transmitter, comprising the steps of:

generating from radar signals received from said target and said non-cooperative remote transmitter a pair of intermediate frequency sine and cosine related quadrature phase signals;

storing a matrix of digital values representing integrated periodic range bin samples of said sine and cosine intermediate frequency signals;

transforming matrix values from each same range bin in the receiving time intervals following successive radar pulses to frequency domain discrete Fourier transform signals;

velocity weighting said Fourier transform signals to delete transform components related to low doppler velocity; and displaying the remaining Fourier transform signal components that also exceed a predetermined amplitude threshold in PPI organized relationship.

2. The method of claim 1 further including the step of normalizing the matrix range bin samples attending each pulse of said pulsed illumination to common matrix values representing said illuminating pulse.

3. The method of claim 1 further including the step of deleting low amplitude matrix values identified in accordance with a predetermined Hamming amplitude weighting criteria from the range bin values used in said transforming step.

4. The method of claim 1 wherein said matrix includes range bin values for a first number of radar illumination pulses and wherein said transforming step includes the processing of matrix range bin values from a smaller second number of radar pulses and wherein new digital values are received in matrix positions between said first and second numbers concurrently with the execution of said transforming step.

5. The method of claim 1 further including the step of correcting the range indication of said target with respect to the relative locations of the radar receiver and transmitter.

6. The method of claim 1 further including the step of summing adjacent pairs of range bin values from the range bins following each transmitter pulse occurrence to enhance targets represented in more than one range bin.

7. The method of claim 6 wherein said summing includes forming the summation of a range bin value with the preceding range bin value to form a first summed value and with the succeeding range bin value to form a second summed value.

8. The method of claim 1, wherein said pulsed radar target illumination is noncoherent in nature.

9. The method of claim 1 wherein said pulsed radar target illumination is coherent in nature.

10. In a passive radar receiver responsive to radar pulses located in the transmit and receive time portions of the pulse repetition interval of a remotely sourced illuminating radar signal, the method for real-time coherently processing received pulse information comprising the steps of:
    mixing the received radar signal with a first local oscillator signal to form a first phase intermediate frequency signal;
    multiplying said received radar signal with a quadrature phased second local oscillator signal to form a second phase intermediate frequency signal having quadrature phase relationship with said first phase intermediate frequency signal;
    integrating each said first and second phase intermediate frequency signals to form first and second integrated signals;
    sampling said first and second integrated signals periodically, once in each of a plurality of range bin time increments commencing at each said radar pulse and extending contiguously through the attending pulse repetition interval, each range bin sample including a pair of signal values related respectively to said first and second integrated signals;
    storing a first array of said digital signal pair values according to pulse repetition interval group order;
    summing adjacent range bin values in each said pulse repeitition interval group of said array, forming thereby a second array of digital signal pair values representing range bin straddling return radar pulse phase and amplitude;
    subtracting a predetermined one of said second array values, a value taken from the same range bin in each pulse repetition interval group, from each other array value in said pulse repetition interval group to form a third array of digital signal pair values having phase compensated, reduced, instability;
    modifying said third array values in accordance with Hamming amplitude weighting to form a fourth array of digital signal pair values of modified radar antenna side lobe content;
    generating the discrete Fourier transform for a predetermined number of corresponding range bin values in each said pulse repetition interval group of said array, forming thereby a doppler frequency fifth array of digital signal values;
    correcting said fifth array signal values to exclude predetermined low velocity weighted components thereof, forming thereby a sixth array of signal values;
    comparing array values in said sixth array with a predetermined amplitude signal threshold, storing a predetermined set of identification parameters for each sixth array value exceeding said threshold;
    adjusting said identification parameters in accordance with the relative physical locations of said radar receiver and radar transmitter;
    displaying said threshold exceeding sixth array values in PPI format in positions identified by said adjusted parameters.

11. The method of claim 10 wherein said step of integrating said intermediate frequency signals includes mathematical integration over a time interval equal to the time of said sampling.

12. The method of claim 11 wherein said sampling time is one-half of the duration of each said illuminating radar pulse.

13. The method of claim 12 wherein said subtracted array value is the first array value in each said pulse repetition interval.

14. The method of claim 13 wherein said subtracted array value corresponds to the illuminating tramsitter pulse in each pulse repetition interval group of said second array.

15. The method of claim 14 wherein said Hamming amplitude weighting corrects the presence of sin x/x side lobes resulting from said transform generating step.

16. The method of claim 15 wherein the contents of said first array is continuously updated with newly-received signal information coincidentally with said transform generating.

17. Coherent passive radar receiver apparatus for use with targets illuminated by a remotely located, non-cooperative pulsed radar transmitter comprising:
    means generating from the signal received from said remote transmitter and radar targets a pair of intermediate frequency sine and cosine related quadrature phase signals;
    means for storing a matrix of digital values representing integrated periodic range bin samples of said sine and cosine intermediate frequency signals;
    means for correcting the matrix range bin sample values relating to each said transmitter pulse for the phase position of said transmitter pulse;
    means for transforming matrix values from corresponding range bins appending a predetermined number of said transmitter pulses to frequency domain Fourier transform signals;
    means for velocity weighting said Fourier transform signals to delete portions thereof representing predetermined doppler velocities; and
    means for displaying the remaining Fourier transform signal components, which also exceed a predetermined amplitude threshold, in organized relationship.

18. The apparatus of claim 17 wherein said means for deleting selected portions includes means for deleting the transform signal portions representing near zero predetermined higher velocity components.

19. The apparatus of claim 17 wherein said means for correcting includes means for subtracting a transmitter pulse indicative signal from each range bin sample value appending each transmitter pulse in a group of transmitter pulses of predetermined length.

20. The apparatus of claim 17 wherein said means for displaying includes a PPI display.

* * * * *